United States Patent [19]
Tang

[11] Patent Number: 5,995,934
[45] Date of Patent: Nov. 30, 1999

[54] METHOD FOR RECOGNIZING ALPHA-NUMERIC STRINGS IN A CHINESE SPEECH RECOGNITION SYSTEM

[75] Inventor: Donald T. Tang, Beijing, China

[73] Assignee: International Business Machines Corporation, Armonk, N.Y.

[21] Appl. No.: 09/143,186

[22] Filed: Aug. 28, 1998

[30] Foreign Application Priority Data

Sep. 19, 1997 [CN] China .................................. 97119650

[51] Int. Cl.⁶ .................................................. G10L 9/06
[52] U.S. Cl. .............................. 704/270; 704/3; 704/9; 704/256
[58] Field of Search .................................. 704/270, 256, 704/3, 9

[56] References Cited

U.S. PATENT DOCUMENTS

| | | | |
|---|---|---|---|
| 5,764,851 | 6/1998 | Pengwu | 704/256 |
| 5,787,230 | 7/1998 | Lee | 704/270 |
| 5,903,861 | 5/1999 | Chan | 704/9 |

*Primary Examiner*—Susan Wieland
*Attorney, Agent, or Firm*—Robert P. Tassinari

[57] ABSTRACT

A recognition method for alpha-numeric strings in a Chinese speech recognition system, uses a special coding scheme to map each of 36 alpha-numeric symbols into an easily remembered Chinese idiom or word consisting of a multiple of Chinese characters. When representing a numeral, each idiom/word starts with the Chinese character for that numeral. When representing an English alphabet letter, each idiom/word will have a first character which starts with that English alphabet letter in its Pinyin form. If it is necessary to include some control words, idiom/words similar in semantics can be used. The method resolves the problem of unreliable recognition when a string of random alpha-numeric symbols or some control words are inputted by voice to a Chinese speech recognition system.

2 Claims, 2 Drawing Sheets

METHOD FOR RECOGNIZING ALPHA-NUMERIC STRINGS IN A CHINESE SPEECH RECOGNITION SYSTEM

FIELD OF THE INVENTION

This invention relates to the techniques of Chinese speech recognition. More specifically, it involves a technique for recognizing alpha-numeric strings in a Chinese speech recognition system.

BACKGROUND OF THE INVENTION

With the advance of modern science and computer technology, the information exchange between human beings and computers is becoming more important. Traditional way of such communication is via a keyboard for input, and via a display or printer for output. When inputting Chinese characters, one needs to remember the coding scheme, which is very inconvenient. If a computer can have the ability of communicating through speech like human beings, then a dialog based on voice would be possible. This will change the man-machine communication fundamentally, and the overall efficiency of information processing will be greatly increased. Presently, with the great efforts of computer scientists, different types of speech recognition systems, and in particular, Chinese speech recognition systems, have been developed.

Since a Chinese character generally has several homonyms and near homonyms, existing Chinese speech recognition systems rely on word, phrase, and higher language level information to resolve the ambiguities in Chinese characters. One generally uses an acoustic model to determine what is the most likely character according to the inputted syllable, and also uses the dictionary with probabilities and the language model where stores the higher level pattern of language usage to resolve the ambiguity of Chinese characters.

However, the recognition of a single Chinese character out of context is very difficult, and typically it may be recognized as any one of a set of characters with same of similar pronunciations. In particular, when inputting Arabic numerals or isolated English alphabets into a Chinese speech recognition system via voice, there is no way to distinguish them from Chinese characters which have the same or similar pronunciations. Generally speaking, Chinese speech recognition systems are typically not trained to recognize English alphabets, and people may pronounce English alphabet letters quite differently.

In summary, a method for reliably recognizing alpha-numeric sequences in a Chinese speech recognition system is needed.

BRIEF DESCRIPTION OF THE INVENTION

The method for recognizing alpha-numeric sequences in a Chinese speech recognition system as described in this invention includes the following steps:

Select a coding scheme in which each numeral, alphabet letter or command is represented by a code word consisting of a multiple characters which is easily remembered and easily recognized idiom or character string.

Build a special vocabulary list in which each entry is a numeral, alphabet letter or command, while its pronunciation is represented by the "pinyin" of the corresponding code word.

Receive an alphabet letter, numeral or command which is inputted as the speech signal S via its code word, and record the context of the speech signal as H.

Using the special vocabulary list, determine the inputted alphabet letter, numeral or command according to the acoustic and language models.

Thus when an alpha-numeric sequence is inputted via voice, one can reliably recognize the voice signal and recover the input sequence from the Chinese idioms or special words used to represent the alpha-numeric sequence.

BRIEF DESCRIPTION OF THE DRAWINGS

The advantages of this invention can be seen more evidently by means of the following description of a concrete implementation.

DETAILED DESCRIPTION

A particular coding scheme selected according to the implementation of this invention provides a standard way to represent 36 alpha-numeric symbols by Chinese character strings. Such Chinese character strings should have the following properties:

Noise resiliency: The length of such a Chinese character string is at least 3 to provide sufficient language discriminating power.

Acoustic distinction: Character strings should not sound similar in their pronunciations.

Ease of use: Idioms are special types of words which have very distinctive meanings and usage.

When representing a numeral, each idiom/word starts with the Chinese character for that numeral.

When representing an English alphabet letter, each idiom/word will have a first character which starts with that English alphabet letter in its "pinyin" form.

There are 3 exceptions with 3 English alphabet letters which are not being used to start any character's pinyin:

"I": Here a character starting with "yi" in its pinyin is used.

"U": Here a character starting with "wu" in its pinyin is used.

"V": Here a character starting with "yu" in its pinyin is used.

To avoid confusion, a character starting with pinyin other than "yi" or "yu" is used for "Y", and a character with pinyin other than "wu" is used for "W".

Table 1 shows the 36 alpha-numeric symbols and the corresponding four-character idioms (and three-character words for numerals). It also shows a couple of sample control words.

Here the above idioms or special words are said to be code words of the corresponding alphabets, numerals or commands.

After selecting the coding scheme such as the one above, one needs to modify the existing Chinese speech recognition system so as to reliably recognize alphabet letters, numerals or commands.

Figure 1:
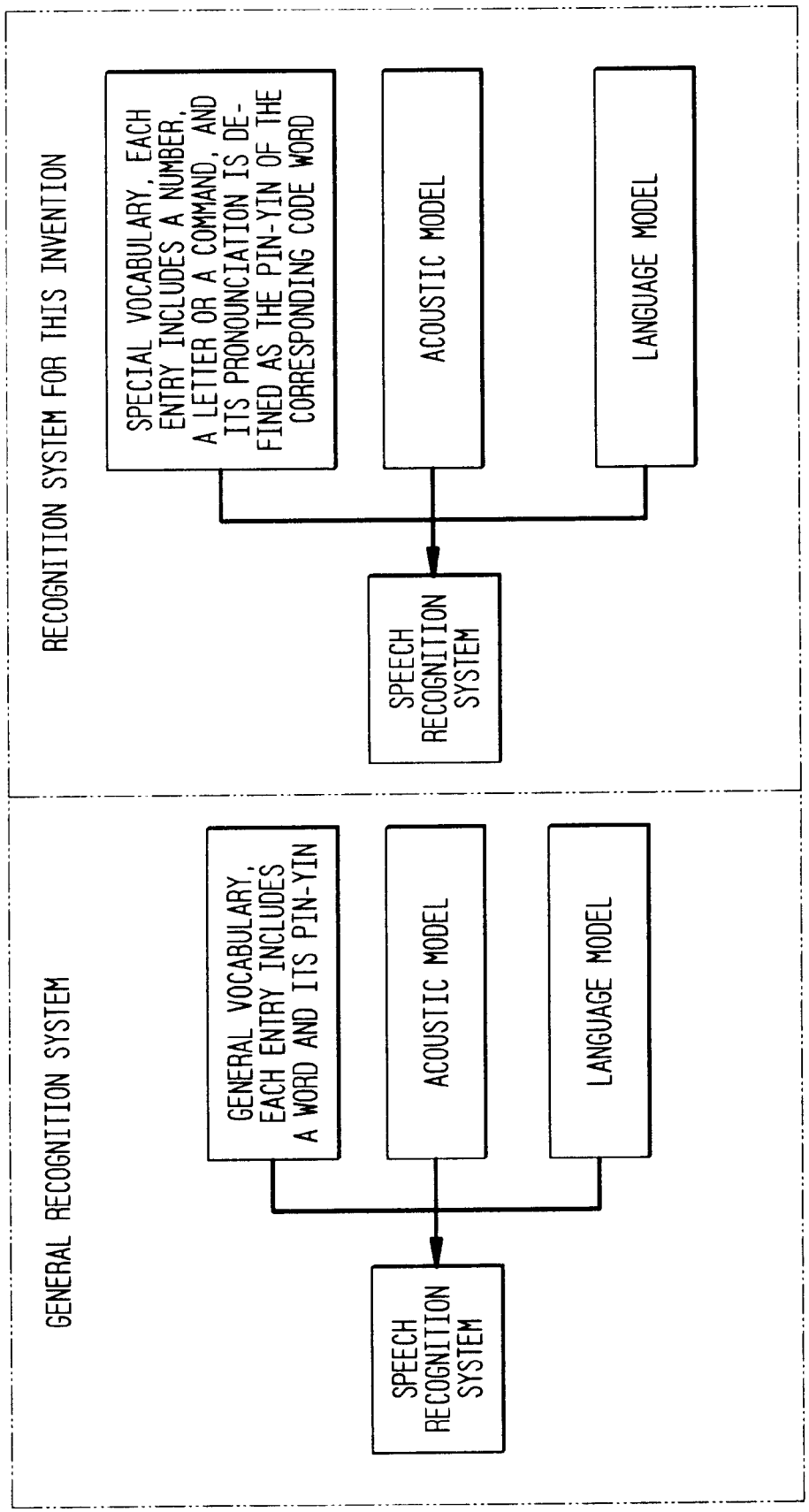
FIG. 1 is a block diagram showing the Chinese speech recognition system as described in this invention.
Figure 2:
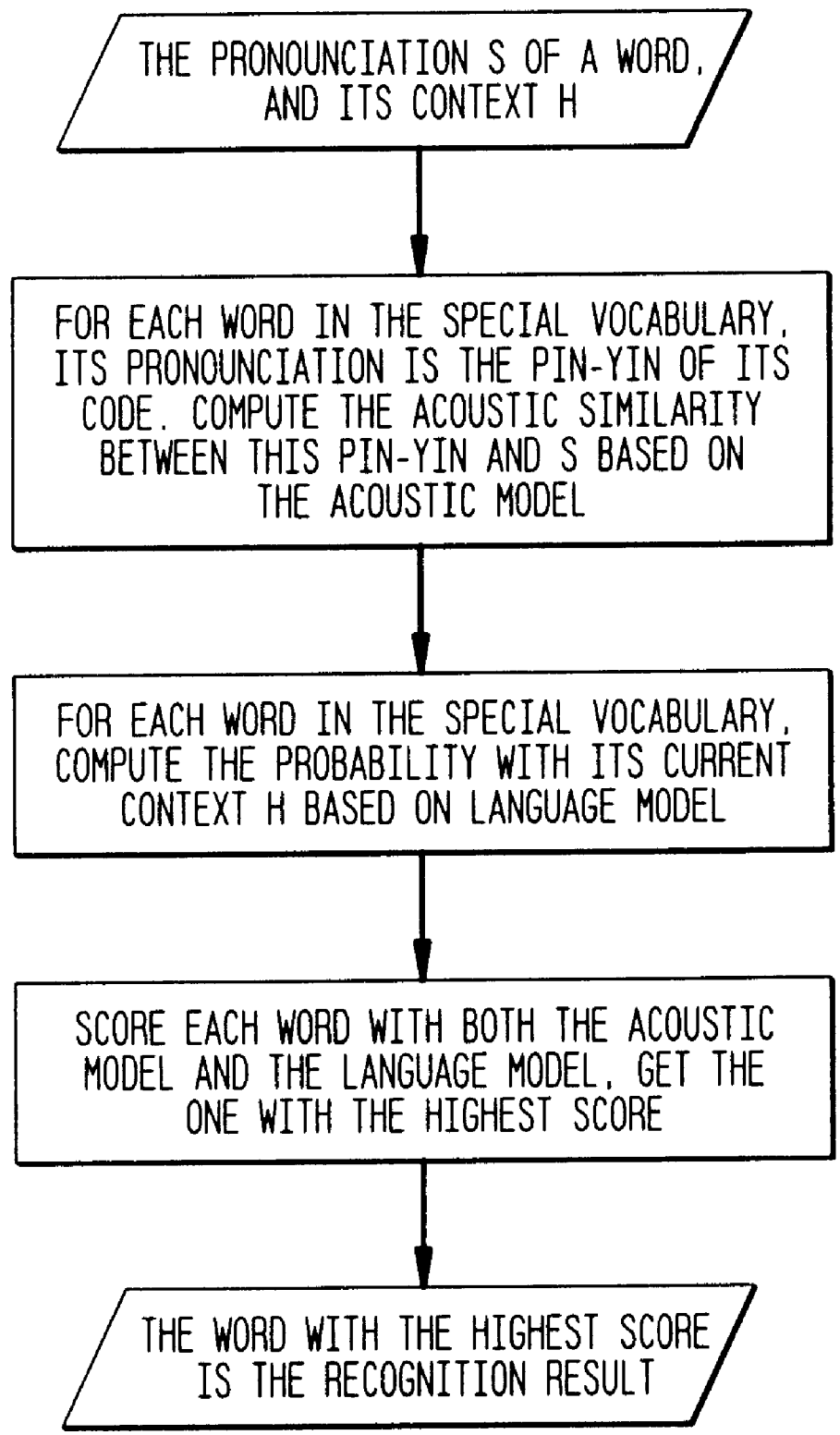
FIG. 2 is a flow chart showing the process of recognizing alphabets, numerals or commands with the Chinese speech recognition system shown in FIG. 1.

FIG. 1 shows separately the standard Chinese speech recognition system and one used in this invention. Each of them consists of a vocabulary list, an acoustic model and a language model. The acoustic model is used to calculate the degree of acoustic similarity between an inputted voice signal S and those listed in the vocabulary list, and the language model is used to calculate the probability of the appearance of a code word in the vocabulary list, given the context H corresponding to the voice signal S. The Chinese speech recognition system of this invention incorporates the use of a specially constructed vocabulary list, in which each entry word is a numeral, alphabet or command, and the pronunciation of each entry word is the "pinyin" of its corresponding code word. Thus when one inputs a letter, numeral or command via its code word, the Chinese speech recognition system as shown in FIG. 1 can recognize it with the following steps:

As shown in FIG. 2, when one inputs a letter, numeral or command, the Chinese speech recognition system of this invention records the pronunciation of the signal S and its context H.

With respect to each entry word Wi in the specially constructed vocabulary list, its pronunciation is that of the corresponding code word Ci, denoted as Py(Ci).

Using the acoustic model, calculate the acoustic similarity between S and each Py(Ci), denoted by P(S/Py(Ci)).

With respect to each entry word Wi in the specially constructed vocabulary list, calculate the probability of appearance of Wi in the context H, denoted as P(Wi/H).

With respect to each entry word Wi in the specially constructed vocabulary list, calculate P(S/Py(Ci))*P (Wi/H), the combined score of each word Wi from language and acoustic models, and find the word Wmax, with the highest score.

Wmax is the recognition result of speech signal S in context H.

From the above illustrations one can see that, the method of this invention for recognizing alphabets, numerals or commands in a Chinese speech recognition can solve the problem of unreliable recognition of random alpha-numeric sequences.

I claim:

1. A recognition method for alpha-numeric strings in a Chinese speech recognition system, characterized by the steps of:
   a) selecting a coding scheme to map each alphabet letter, numeral or command into an easily remembered Chinese idiom or word consisting of a multiple of Chinese characters, which is referred to as encoded word;
   b) creating a special vocabulary, each word of which is an alphabet letter, numeral or command; and the speech of said word is the Pinyin of its corresponding encoded word;
   c) receiving an alphabet letter, numeral or command inputted by the speech of said encoded word, and recording the context of the speech;
   d) determining the inputted alphabet, numeral or command by referring to said special vocabulary on the basis of acoustic model and language model.

2. The method of claim 1, including:
   e) when representing a numeral, starting each idiom/word with the Chinese character for that numeral;
   f) when representing an English alphabet letter, having an idiom/word that will start a first character of that English alphabet letter in its Pinyin form;
   g) when representing a control word, using an idiom/word similar in semantics.

* * * * *